March 16, 1937.  L. J. ANDRES  2,073,773
PHOTOELECTRIC CONVERTER
Filed Sept. 27, 1933

Inventor
Lloyd J. Andres
by John E. Titus Atty.

Patented Mar. 16, 1937

2,073,773

UNITED STATES PATENT OFFICE 2,073,773

PHOTOELECTRIC CONVERTER

Lloyd J. Andres, Grand Rapids, Mich., assignor to Automatic Musical Instrument Company, Grand Rapids, Mich., a corporation of Michigan Application September 27, 1933, Serial No. 691,175

2 Claims. (Cl. 179—100.31)

This invention relates to means for transposing an image into electrical energy, and more particularly, for reproducing the original from the photographic record of sound waves, mechanical movements, or other such events.

This invention will be herein described as embodied in the reproducer of a sound record which is recorded in a track on a motion picture film. The sound is photographed in a narrow track which is, by one common method, of variable density, where the sound vibrations are impressed upon a variable light source. By another common method, the sound is recorded by oscillating means with the result that the track varies in width.

In reproducing the sound, a ribbon of light is directed into a photo cell and the light is brought into moving relation with the sound track so that its intensity or width, or the amount of light is affected thereby so as to correspond with the sound vibrations.

In order to prevent overlapping of the sound phases, and distortion, it is essential that the light beam or ribbon be very thin where it comes into relation with the track. Also, it is an advantage to have the area of the beam increased as it comes into relation with the light sensitive electrical control element, after it leaves the image.

Heretofore, such mechanism involved optical lenses and mechanical apertures and consequently have required exceedingly accurate and fine adjustments in order to obtain the desired thinness and intensity and to obtain the requisite focusing. Therefore, a main object of this invention is to provide a simplified device in which less accuracy of construction and adjustment is required; also to substantially eliminate the necessity of close focusing; and to obviate the necessity of using a specially constructed lamp for the light source.

Other objects, and this invention will become apparent in the following description, with reference to the accompanying drawing in which an illustrative embodiment of this invention is shown;

Figures 1, 2:
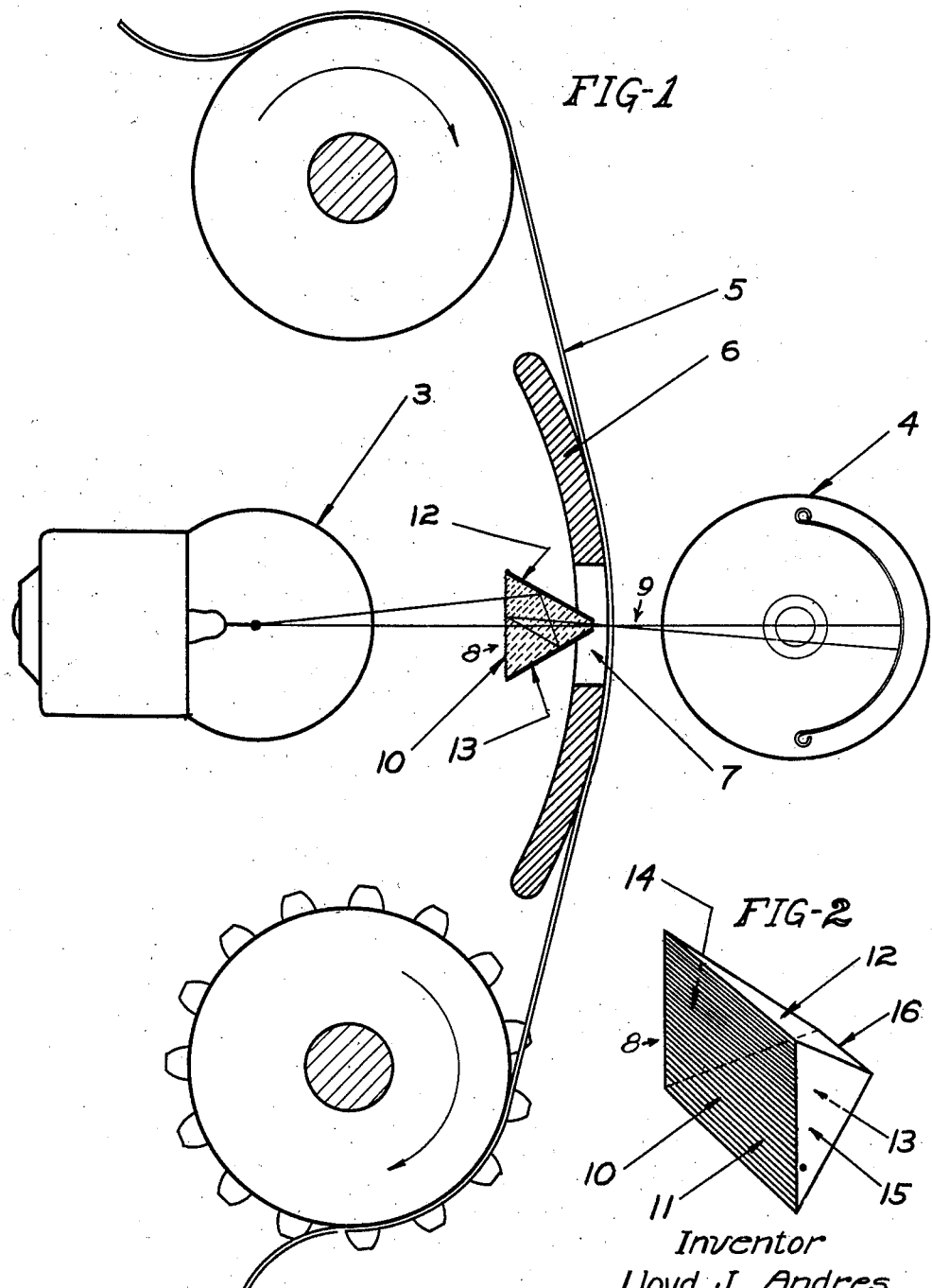
Fig. 1 is a diagrammatic view of the device.
Fig. 2 is a perspective view of the prism shown in Fig. 1.

A steady light source 3 which may be any common form of lamp is mounted in spaced relation with a photoelectric cell 4; and the film 5, having a sound track photographed thereon, is guided and moved between the lamp 3 and the cell 4 as shown, the film being moved over a fixed supporting plate 6 which has a suitable aperture 7.

Between the plate 6 and the lamp 3 is fixedly mounted a prism 8 which collects unfocused rays of light from the source and directs a large portion of the rays in a thin ribbon beam of light 9; thru the portion of the film on which the sound is recorded, and into the cell 4. The cross section of the prism is a right angle triangle, and the base 10 which is exposed to the light is rectangular. On the base is formed a fine linear grid screen 11 for collecting and breaking up the light rays. In practice, this screen is formed by grooving the surface of the prism in a thousand or more lines per inch.

The sides 12 and 13 of the prism are opaquely coated, as well as the ends 14 and 15 which are inclined so as to reduced the length of the apex 16 which is left uncoated. In practice, the apex is ground to remove the coating, but the area of the surface is made as narrow as possible so that its actual width is about one half a thousandth of one inch.

The screen 11 will collect light rays coming from various directions, and a large portion of the rays striking on the screen are deflected in the interior of the prism and reflected out thru the apex. Accordingly, the beam is polarized within a small angle, and the area increases somewhat with the distance from the point of emission. Therefore, the screen 5 is passed very close to the apex but does not have to be in contact as has been required in prior devices and caused either scratching of the film or the glass.

By this arrangement nearly any ordinary form of lamp which gives off a steady light, may be used, and no special accuracy is required in the relation of the lamp to the prism. Obviously, the location of the screen with respect to the prism is not particularly delicate so that no close adjustments are needed. Also the beam may be reflected by the image, or passed thru as shown and the one arrangement is applicable to either the variable density, or the oscillating form of sound track.

Having thus described my invention I claim:

1. The combination in a sound reproducer, an optical system consisting of an ordinary constant voltage lamp, a triangular prism having a rectangular base exposed to the light, a fine grid screen formed on the base, the ends of the prism being inclined to reduce the length of the apex and the sides and the ends of the prism being coated to direct a large portion of the rays striking the base thru the apex in a thin beam light, means for guiding a film having a track of images thereon in close relation to the apex, and a photoelectric cell for receiving the beam after it passes the film.

2. In a sound reproducer, an optical system for producing a line of light on a film for reproduction purposes consisting only of an ordinary electric lamp for a source of light, a triangular prism having a grating formed on its base, the sides and ends of the prism being opaquely coated, means for guiding a film having a track of images thereon in close proximity to the apex of the prism, and a photoelecric cell for receiving the beam after it passes the film.

LLOYD J. ANDRES.